United States Patent
Kaufmann et al.

(10) Patent No.: US 11,081,993 B2
(45) Date of Patent: Aug. 3, 2021

(54) METHOD FOR OPERATING A PERMANENT MAGNET SYNCHRONOUS MOTOR, AND MOTOR ASSEMBLY

(71) Applicant: Continental Teves AG & Co. oHG, Frankfurt am Main (DE)

(72) Inventors: Tom Kaufmann, Frankfurt am Main (DE); Bogdan Budianu, Frankfurt am Main (DE); Eugen Bartel, Frankfurt am Main (DE); Dominik Schulte, Frankfurt am Main (DE); Peter Stauder, Frankfurt am Main (DE)

(73) Assignee: CONTINENTAL TEVES AG & CO. OHG, Frankfurt am Main (DE)

( * ) Notice: Subject to any disclaimer, the term of this patent is extended or adjusted under 35 U.S.C. 154(b) by 0 days.

(21) Appl. No.: 16/651,602

(22) PCT Filed: Oct. 2, 2018

(86) PCT No.: PCT/EP2018/076788
§ 371 (c)(1),
(2) Date: Mar. 27, 2020

(87) PCT Pub. No.: WO2019/068706
PCT Pub. Date: Apr. 11, 2019

(65) Prior Publication Data
US 2020/0287491 A1    Sep. 10, 2020

(30) Foreign Application Priority Data
Oct. 6, 2017 (DE) ...................... 10 2017 217 792.6

(51) Int. Cl.
*B62D 5/04* (2006.01)
*H02P 21/22* (2016.01)
*H02P 21/00* (2016.01)

(52) U.S. Cl.
CPC .......... *H02P 21/22* (2016.02); *H02P 21/0089* (2013.01)

(58) Field of Classification Search
CPC ...... B62D 5/046; H02P 21/22; H02P 21/0089
See application file for complete search history.

(56) References Cited

U.S. PATENT DOCUMENTS

| 9,099,953 B2 | 8/2015 | Merkel et al. |
| 2014/0035491 A1* | 2/2014 | Mukai .................. B62D 5/046 318/400.02 |

(Continued)

FOREIGN PATENT DOCUMENTS

| DE | 102010061897 A1 | 5/2012 |
| DE | 102011121608 A1 | 6/2013 |

(Continued)

OTHER PUBLICATIONS

German Search Report for German Application No. 10 2017 217 792.6, with partial English translation, dated Jun. 12, 2018, 9 pages.

(Continued)

*Primary Examiner* — Cortez M Cook
(74) *Attorney, Agent, or Firm* — RatnerPrestia

(57) ABSTRACT

A method for operating a permanent magnet synchronous motor, an operational vector being determined in a multi-stage process. A motor assembly configured to perform such a method is also disclosed.

17 Claims, 4 Drawing Sheets

(56) References Cited

U.S. PATENT DOCUMENTS

2014/0312812 A1\* 10/2014 Sasaki ................ H02P 21/0089
318/400.02
2017/0257055 A1    9/2017 Kitaori et al.

FOREIGN PATENT DOCUMENTS

| DE | 102015209624 A1 | 12/2016 |
|----|-----------------|---------|
| DE | 102015223365 A1 | 6/2017  |
| DE | 102015224586 A1 | 6/2017  |
| DE | 102016203262 A1 | 8/2017  |

OTHER PUBLICATIONS

International Search Report and Written Opinion for International Application PCT/EP2018/076788, dated Jan. 17, 2019, 9 pages.
Stewart et al., "Dynamic Control of Permanent Magnet Synchronous Motors for Automotive Drive Applications", Proceedings of the 1999 American Control Conference; Jun. 2-4, 1999, Hyatt Regency, San Diego, CA, USA, IEEE Service Center, Piscatawy, NJ, vol. 3, Jun. 2, 1999, pp. 1677-1681.

\* cited by examiner

METHOD FOR OPERATING A PERMANENT MAGNET SYNCHRONOUS MOTOR, AND MOTOR ASSEMBLY

CROSS REFERENCE TO RELATED APPLICATIONS

This application is the U.S. National Phase Application of PCT International Application No. PCT/EP2018/076788, filed Oct. 2, 2018, which claims priority to German Patent Application No. 102017217792.6, filed Oct. 6, 2017, the contents of such applications being incorporated by reference herein.

FIELD OF THE INVENTION

The invention relates to a method for operating a permanent magnet synchronous motor and to a motor assembly with a permanent magnet synchronous motor and an electronic control device for performing such a method.

BACKGROUND OF THE INVENTION

Permanent magnet synchronous motors can be used for example to actuate a brake system of a motor vehicle. For this purpose, a torque request is specified for example, with the motor generating a corresponding torque. However, permanent magnet synchronous motors are also subject to various constraints, relating for example to current or voltage. Such constraints should be observed during operation to avoid malfunctioning or destruction of the motor. In cases of doubt in this respect, it must also be accepted that the torque request cannot be fully met.

For the operation of permanent magnet synchronous motors, for example a control system based on the principle of field weakening is used, in order to demand from the motor a constant torque in the greatest possible speed range. In the case of embodiments known from the prior art, predefined tables in which calculated values for certain motor parameters and constraints are stored are typically used. However, these are static and can therefore neither be adjusted to operating parameters that actually occur, nor can they be used for different motors without respective recalculation.

SUMMARY OF THE INVENTION

Therefore, an aspect of the invention is a method for operating a permanent magnet synchronous motor that is improved in this respect. Another aspect of the invention is an associated motor assembly.

An aspect of the invention relates to a method for operating a permanent magnet synchronous motor, the operating parameters of which are specified in a two-dimensional d/q coordinate system, the method comprising the following steps:
receiving a torque request,
converting the torque request into a first vector, the q coordinate of which corresponds to the torque request and the d coordinate of which is zero,
representing a number of constraints as areas in the d/q coordinate system, each required area representing a constraint such that an operational vector should lie within the required area, and each prohibited area representing a constraint such that an operational vector should lie outside the prohibited area,
checking whether the first vector lies within all required areas and outside all prohibited areas,
if so, using the first vector as an operational vector,
if not:
determining respective highest q coordinates of the required areas, and reducing the q coordinate of the first vector to the lowest of the highest q coordinates of the required areas, thereby obtaining a second vector,
checking whether the second vector lies within a first required area,
if so, using the second vector as a third vector,
if not, changing the d coordinate of the second vector, so that it lies on a limitation of the first required area with the smallest amount of the d coordinate, thereby obtaining a third vector,
checking whether the third vector lies within a second required area,
if so, using the third vector as a fourth vector,
if not, changing the coordinates of the third vector along a change limitation up to the point of intersection between a limitation of the second required area with the change limitation with the highest q coordinate, thereby obtaining a fourth vector,
determining an operational vector on the basis of the fourth vector,
activating the permanent magnet synchronous motor by means of operational parameters that are indicated by the operational vector.

Such a procedure allows the determination of an ideal operational vector. In this case, the q coordinate is based as closely as possible on the torque request, i.e. if a torque that is lower than the requested torque is delivered, it is as high as possible. In addition, the d coordinate is as low as possible, which leads to a low power loss.

The method described here can in particular be performed with a very short computing time, which allows implementation in motor controls suitable for practical use. It is possible to dispense with complex calculations and predefined tables for constraints.

The two-dimensional d/q coordinate system may be based in particular on a Clarke-Park transformation. Operational parameters of the permanent magnet synchronous motor can thus be represented in two dimensions.

In the context of this application, the term vector should be understood in particular as referring to its tip. This can for example be changed, or it can be checked whether it is within or outside a certain range.

With regard to the q coordinates used here, it should be mentioned that the method sequence described assumes a positive torque request, which leads to a positive q coordinate. This is to make the description easier to understand, but does not limit the scope of protection. In the case of a negative torque request, which may for example lead to an opposite direction of rotation, the signs would have to be changed.

If the q coordinate of the first vector is already less than or equal to the lowest of the highest q coordinates of the required areas, it is possible to dispense with reducing the q coordinate.

It is advantageously provided that the method for determining an operational vector on the basis of the fourth vector comprises the following steps:
checking whether the fourth vector lies within a third required area,
if so, using the fourth vector as an operational vector,
if not, changing the coordinates of the fourth vector along the change limitation up to the point of intersection between a limitation of the third required area with the change limitation with the highest q coordinate, thereby obtaining the operational vector.

This allows a further restriction to be taken into account.

According to respective advantageous embodiments of the method, it is provided that the first required area defines a maximum voltage of the motor, and/or the second required area defines a maximum current of the motor, and/or the third required area defines a maximum battery current.

This has been found to be a practical procedure for typical operating situations.

According to one embodiment, it is provided that the change limitation is a limitation of the first required area. This applies in particular in a case in which the torque request defines a torque for driving or accelerating the motor.

According to one possible embodiment, the torque request defines a torque for driving or accelerating the motor. As a result, a motor can be set in motion or kept in motion.

According to one possible embodiment, the torque request defines a torque for braking the motor. As a result, a motor can be braked, for example in order to stop it.

According to one embodiment, the following steps are performed before the step of checking whether the third vector lies within the second required area:

checking whether the third vector lies within a first prohibited area, if not, leaving the third vector unchanged for the next step, if so, increasing the amount of the d coordinate of the third vector up to a limitation of the first prohibited area before the next step.

As a result, compliance with a condition that can be represented by a prohibited area can be checked or ensured.

According to one embodiment, the first prohibited area defines a minimum battery current. This is relevant in particular in the case of a braking torque. In this case in particular, the motor may act or be operated as a generator.

According to possible embodiments, it is provided that if the third vector is left unchanged in response to checking whether it lies within the first prohibited area, the change limitation is a limitation of the first required area, and/or if the amount of the d coordinate of the third vector is increased in response to checking whether it lies within the first prohibited area, the change limitation is a limitation of the first prohibited area.

Such procedures have proven to be advantageous for typical applications.

According to respective embodiments, it is provided that the first required area defines a maximum voltage of the motor, and/or the second required area defines a maximum current of the motor, and/or the third required area defines a maximum battery current.

This has proven to be advantageous for typical real cases, in order to arrive at the best possible result.

According to one embodiment, it is provided that the d coordinates of all of the vectors are negative. This corresponds to typical and advantageous operating situations.

The vectors are preferably moved along the change limitation by means of calculating points of intersection. For example, functions and/or parameterizations may be used.

The required areas and/or the prohibited areas are preferably circles. This allows typical constraints, in particular of the types specified, to be represented.

According to one embodiment, it is provided that at least one required area, which defines a maximum voltage of the motor, depends on a speed of the motor. This reflects real behavior in typical applications.

It should be mentioned that a method may in particular also be implemented in such a way that it can be performed both for accelerating torque requests and for braking torque requests.

It should be understood that the method according to an aspect of the invention can be used in particular in a motor vehicle or in a brake system of a motor vehicle. For example, the permanent magnet synchronous motor can provide or generate a braking force of a brake system of a motor vehicle.

An aspect of the invention relates furthermore to a motor assembly which has a permanent magnet synchronous motor and an electronic control device that is configured to perform a method according to an aspect of the invention. With respect to the method, it is possible to revert to all of the embodiments and variants described herein. The advantages mentioned further above can be achieved by means of the motor assembly according to an aspect of the invention.

BRIEF DESCRIPTION OF THE DRAWINGS

Further features and advantages will be taken by a person skilled in the art from the exemplary embodiment described below with reference to the appended drawing, in which.

DETAILED DESCRIPTION OF THE PREFERRED EMBODIMENTS

Figure 1:
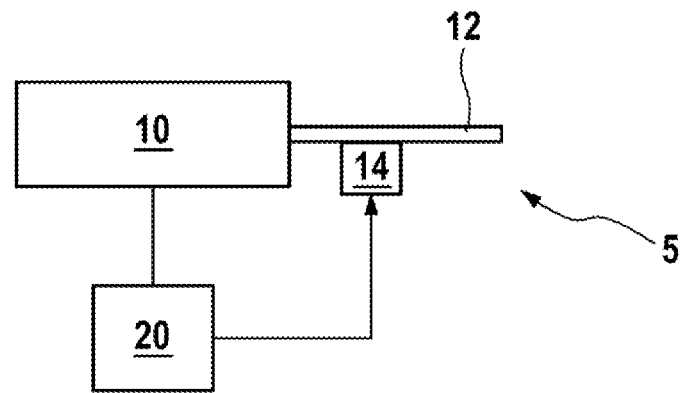
FIG. 1 shows a motor assembly.

FIG. 1 shows a motor assembly 5 according to an exemplary embodiment of the invention. The motor assembly 5 has a permanent magnet synchronous motor 10. It has a shaft 12, which rotates when the permanent magnet synchronous motor 10 is in operation. Attached to the shaft 12 is a speed sensor 14, which senses a respective speed of the shaft 12.

The motor assembly 5 has furthermore an electronic control device 20. This is designed to control the motor 10, for example as described further below.

The motor 10 may be controlled in particular on the principle of field weakening. As a result, a constant torque can be demanded from it in the greatest possible speed range. Since the current is typically proportional to the torque, a torque request is realized for example via a current controller, which is shown in FIG. 2.

Figure 2:
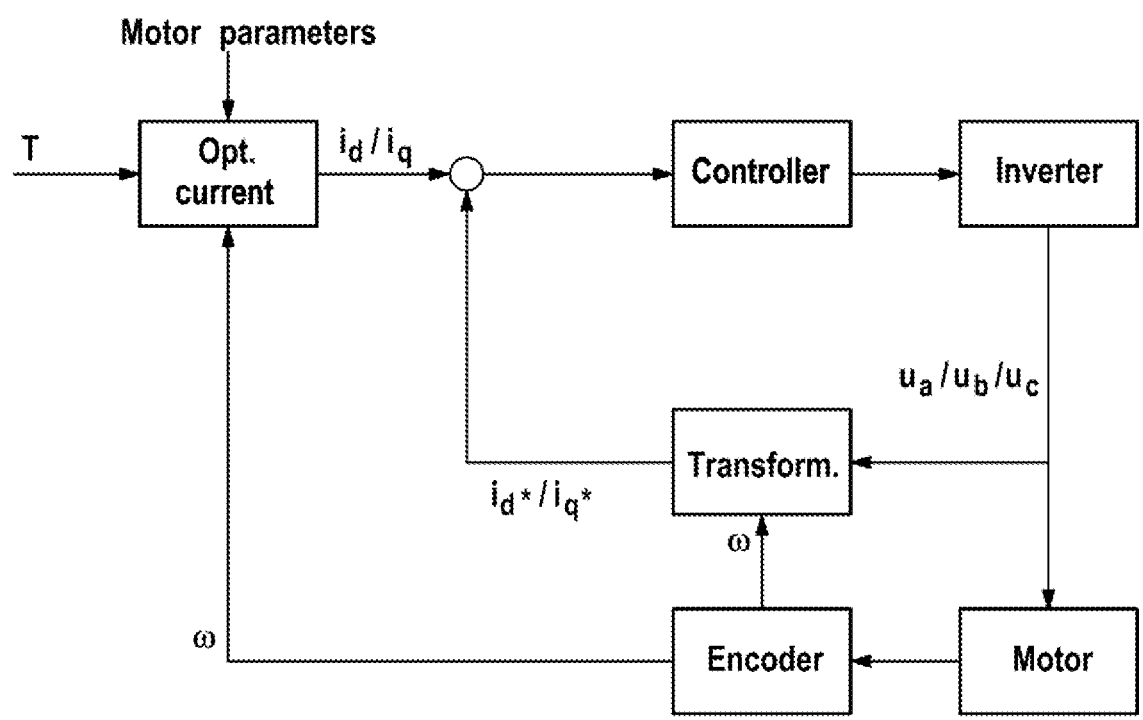
FIG. 2 shows a schematic procedure for controlling a motor.

FIG. 2 accordingly shows only schematically a procedure for controlling a current or a current controller. Currents $i_d$ and $i_q$ obtained by a Clarke-Park transformation are used in a d/q coordinate system. The operational parameters of a permanent magnet synchronous motor can thus be represented in two dimensions.

It should be mentioned that, in order to calculate an optimal current ("opt. current"), as shown, a torque request T and motor parameters ("motor parameters") are used. Furthermore, a controller ("controller"), an inverter, a transformer and an encoder are used. Voltage variables $u_a/u_b/u_c$ are also included in the calculation.

Since the controller works in a network with other systems, it must adhere to current and voltage limitations of the motor 10 or the system network. Because of these limitations, not every torque request can be converted proportionally into a current reference variable. If possible, a torque request should be converted directly. If this is not possible, however, because one of the limitations would be violated, the next lower possible torque request should be determined.

Limiting conditions for currents and voltages can be represented as follows:

$$I_{dq} \leq I_{dq\,max} \quad (1)$$

$$U_{dq} \leq U_{dq\,max} \quad (2)$$

$$I_{bat\,min} \leq I_{bat} \leq I_{bat\,max} \quad (3)$$

in which $I_{dq}$ is the current in the d/q coordinate system, $I_{dqmax}$ is the maximum current in the d/q coordinate system, $U_{dg}$ is the voltage in the d/q coordinate system, $U_{dqmax}$ is the maximum voltage in the d/q coordinate system, $I_{batmin}$ is the minimum battery current, $I_{batmax}$ is the maximum battery current and $I_{bat}$ is the battery current.

Equations (1), (2) and (3) thus define a maximum current of the motor, a maximum voltage of the motor, a minimum battery current and a maximum battery current as limiting conditions. These are typical limiting conditions when using a permanent magnet synchronous motor, in particular in the automotive sector.

The currents $i_d$, $i_g$ in the d/q coordinate system can be converted into respective voltages $u_d$, $u_g$ in the d/q coordinate system and vice versa:

$$u_d = Ri_d - p\omega_m L_q i_q \quad (4)$$

$$u_q = Ri_q + p\omega_m L_d i_d + p\omega_m \varphi_{pm} \quad (5)$$

in which R is the resistance of the motor, p is the number of pairs of poles, which may for example have a value of 7, $\omega_m$ is the speed, $L_q$ is the inductance in the q coordinate, $L_d$ is the inductance in the d coordinate and $\varphi_{pm}$ is the magnetic flux.

Furthermore, it is possible to use the energy balance $$I_{bat} = \frac{3i_q \varphi_{pm} \omega_m p + 3R(i_d^2 + i_q^2)}{2U_{bat}} \quad (6)$$

in which also $U_{bat}$ is the battery voltage.

Furthermore, mention should also be made of the torque equation for reluctance-free permanent magnet synchronous motors:

$$Tm = \tfrac{3}{2} i_q \varphi_{pm} p \quad (7)$$

in which $T_m$ is a mechanical torque.

The following equations of a circle result from this:

$$I_{dq\,max}^2 \geq i_d^2 + i_q^2 \quad (8)$$

$$\frac{U_{bat}^2}{3Z} \geq \left(i_d + \frac{L\varphi_{pm}(\omega_m p)^2}{Z}\right) + \left(i_q + \frac{R\varphi_{pm}\omega_m}{Z}\right)^2 \quad (9)$$

$$\frac{2I_{bat\,max}U_{bat}}{3R} + \frac{k_t^2 \omega_m^2}{9R^2} \geq \left(i_q + \frac{k_t \omega_m}{3R}\right)^2 + i_d^2 \quad (10)$$

$$\frac{2I_{bat\,min}U_{bat}}{3R} + \frac{k_t^2 \omega_m^2}{9R^2} \leq \left(i_q + \frac{k_t \omega_m}{3R}\right)^2 + i_d^2 \quad (11)$$

$$Z = R^2 + L^2(\omega_m p)^2 \quad (12)$$

in which also Z is an equivalent quantity for a complex resistance and $k_t$ is a torque constant, which is typically related to the magnetic flux via the relationship $$\varphi_{pm} = \frac{2}{3} \cdot \frac{k_t}{p}.$$

The equations of a circle enclose a common area, which is dependent on the motor speed Wm. In order to meet all of the conditions, a current vector or operational vector must lie within this area and outside the minimum current circle.

Figure 3:
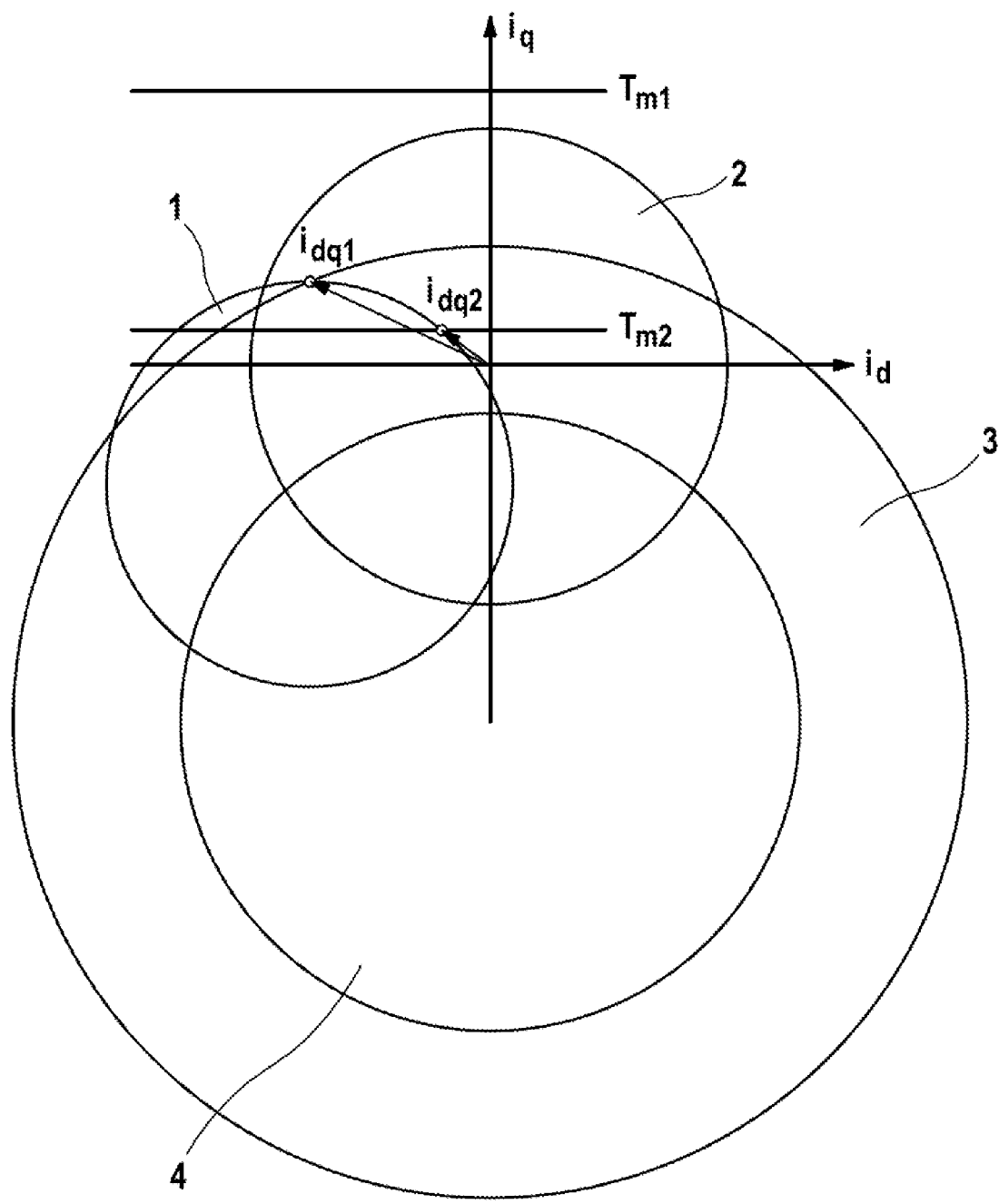
FIG. 3 shows typical constraints in a d/q coordinate system.

FIG. 3 shows the circles on the current level. A voltage circle 1, a motor current circle 2, a maximum battery current circle 3 and a minimum battery current circle 4 are shown. The representation takes place here in a d/q coordinate system with a d current $i_d$ and a q current $i_q$.

FIG. 3 also shows a first torque request $T_{m1}$. It can be seen that, when converted to a q coordinate, it is outside the limitations, and therefore cannot be realized as such. Also shown is a second torque request $T_{m2}$, which can be realized.

The first torque request $T_{m1}$ can be partially realized by means of a first vector $i_{dq1}$, i.e. a maximum possible torque that is consistent with all given boundary conditions can be generated. The second torque request $T_{m2}$ can be realized directly by means of a second vector $i_{dq2}$. The two vectors $i_{dq1}$, $i_{dq2}$ are each selected such that, while meeting the respective torque request $T_{m1}$, $T_{m2}$ as well as possible, they have the lowest possible d coordinate in order to generate the lowest possible power loss.

The problem to be solved is to set up a calculation strategy that determines an optimal current vector with the least possible computing effort. An optimal current vector is typically a current vector that does not violate any of the limitations listed, contains a torque-generating q current which generates a torque that corresponds as closely as possible to the required torque, and contains the lowest possible d current, in particular in terms of the amount.

It should be mentioned that the second torque request $T_{m2}$ could also be implemented by other vectors. However, these have a d current of a higher amount and are therefore not optimal.

A possible procedure in the context of a method according to an aspect of the invention is described below. A step-by-step approach is followed, which leads to an operational vector. This approach is shown with reference to FIG. 4.

First, a torque request $T_m$ is converted into a q current $i_q$. This takes place by means of the following equation:

$$i_q = \frac{2T_m}{3\varphi_{pm}p} \quad (13)$$

Figure 4:
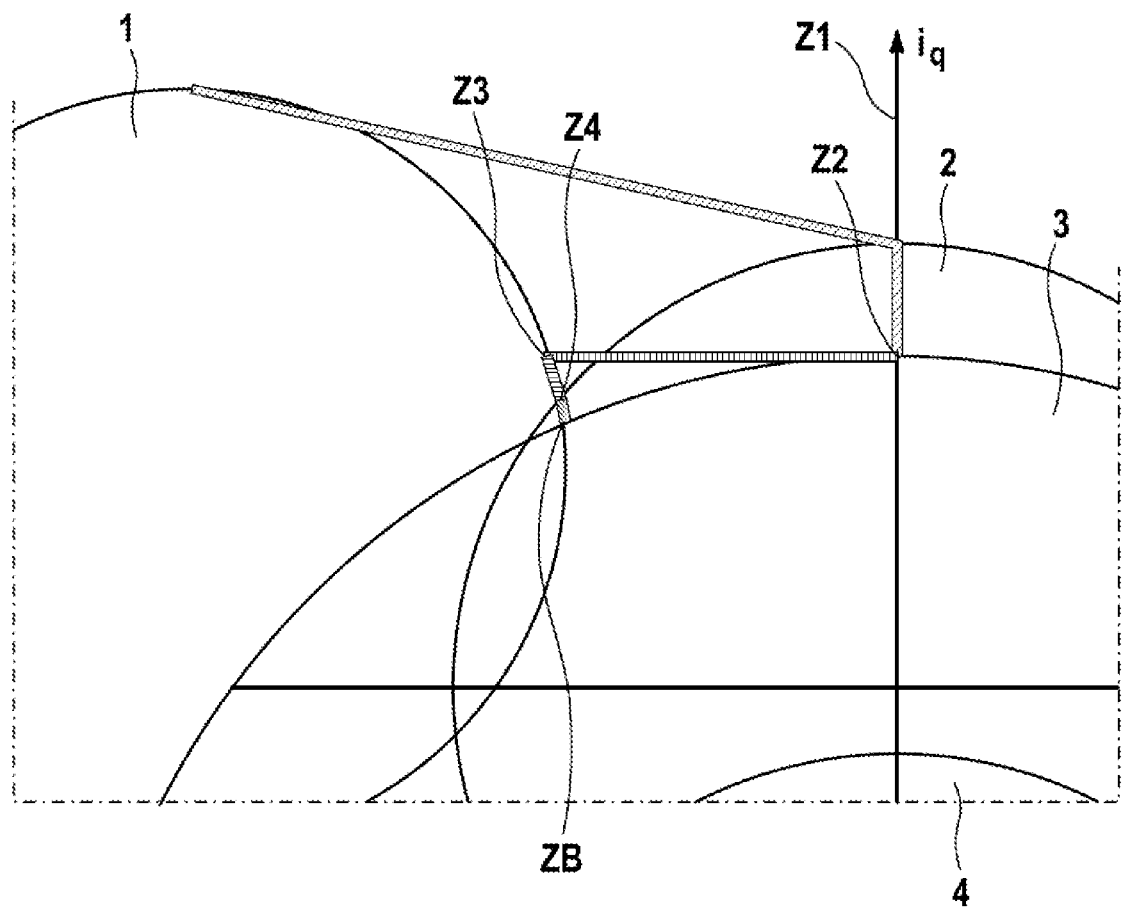
FIG. 4 shows a procedure for the determination of an operational vector in the case of a positive torque.

From this, a first vector Z1 is calculated, which results from the fact that the q coordinate is set to the calculated value $i_q$ and the d coordinate is set to the value 0. This vector Z1 is shown in FIG. 4. It should be mentioned that in FIGS. 4 and 5 the vectors depicted are only depicted in such a way that their respective end points are indicated by the connecting lines with the respective designation. The complete vectors are not shown as such to simplify the representation.

As shown, the first vector Z1 is initially outside the limitations indicated. Once this has been established, the q coordinate of the first vector Z1 is reduced to such an extent that its q coordinate corresponds to the q coordinate of the lowest of all of the highest points of the required areas 1, 2, 3. A second vector Z2 is thereby obtained.

It is then checked whether the second vector Z2 lies within the first required area 1, that is to say the voltage circle. This is not the case. The d coordinate of the second vector Z2 is thus increased in amount until the second vector Z2 comes to lie on the limitation of the first required area 1 while the q coordinate remains the same. A third vector Z3 is thereby obtained.

The third vector Z3 is then used to check whether it lies within the second required area 2, that is to say the motor current circle. This is not the case. The third vector Z3 is then changed along the limitation of the first required area 1 until it intersects the limitation of the second required area 2. A fourth vector Z4 is thereby obtained. The fourth vector Z4 is then checked for whether it lies within a third required area 3. This is not the case. Thus, the fourth vector Z4 is changed along the limitation of the first required area 1 until it intersects a limitation of the third required area 3. An operational vector ZB is thereby obtained. This lies within all of the required areas 1, 2, 3 and also outside the only prohibited area 4.

The motor can thus be operated by means of the operational vector ZB, the maximum possible torque being achieved and at the same time the lowest possible d coordinate being used.

The high points of the required areas 1, 2, 3 mentioned further above can be calculated with respect to their respective q coordinate, which is relevant here, by the following equations:

$$i_{hpc} = I_{dq\ max} \quad (14)$$

$$i_{hpv} = \sqrt{\frac{U_{bat}^2}{3Z} - \frac{R\varphi_{pm}\omega_m}{Z}} \quad (15)$$

$$i_{hpb} = \sqrt{\frac{2I_{bat\ max}U_{bat}}{3R} + \frac{k_t^2\omega_m^2}{9R^2}} - \frac{k_t\omega_m}{3R} \quad (16)$$

in which $i_{hpc}$ is the q coordinate of the high point of the current circle, $i_{hpv}$ is the q coordinate of the high point of the voltage circle and $i_{hpb}$ is the q coordinate of the high point of the battery current circle.

Since the voltage circle depends on the angular velocity $\omega_m$, its radius decreases at higher speeds. This is represented for example by equation (9) above.

It should be mentioned that the points of intersection mentioned can in each case also have fundamentally different solutions. However, in principle, those with the highest q coordinate and smallest d coordinate are used here. The others are not useful for the calculation relevant here.

When the motor is operated with an accelerating torque request, the minimum battery current circle, as the only prohibited area 4, can be disregarded, since its constraint is satisfied in principle. However, this does not apply if a torque for braking is generated, when the motor is therefore running as a generator. A corresponding state is shown in FIG. 5.

Figure 5:
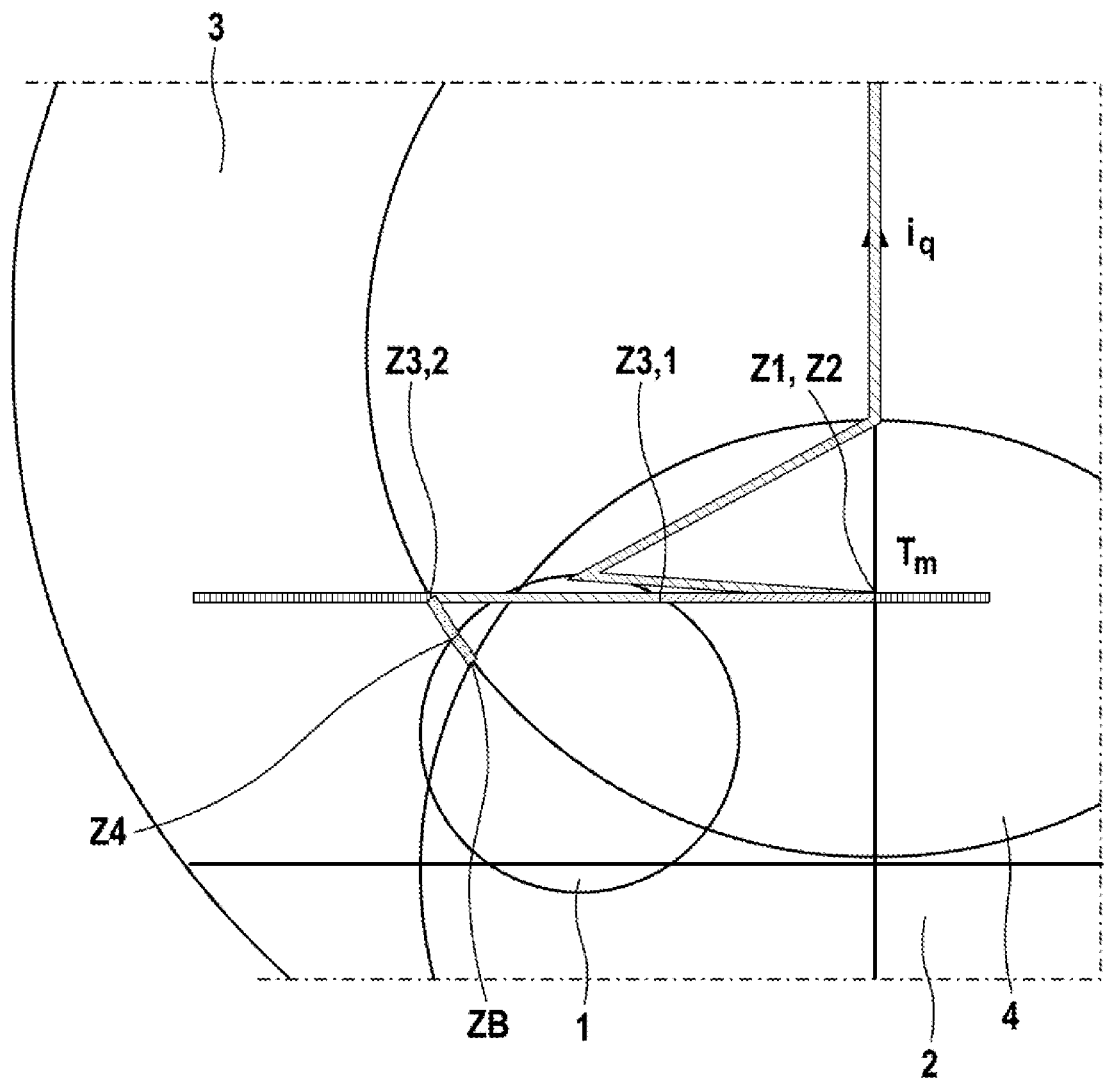
FIG. 5 shows a procedure for the determination of an operational vector in the case of a negative torque.

The required areas 1, 2, 3 and the prohibited area 4 are also shown in FIG. 5. However, the first required area 1, i.e. the voltage circle, is located at a different location and is smaller. In addition, the motor is operated as a generator, with a torque $T_m$ shown here as positive being intended for braking a negatively rotating motor.

The torque request $T_m$ shown in FIG. 5 can be converted directly into a first vector Z1, which is already below all of the high points of the required areas 1, 2, 3. It can therefore be used directly as a second vector Z2.

It is then checked whether the second vector Z2 lies within the first required area 1, that is to say the voltage circle. This is not the case. Accordingly, the d coordinate of the second vector Z2 is increased until the second vector Z2 lies on a limitation of the first required area 1. A third vector Z3,1 is thereby obtained in a first version.

The third vector Z3,1 in the first version is then checked for whether it is outside the first prohibited area 4, that is to say the minimum battery current circle. This is not the case. Accordingly, the q coordinate of the third vector Z3,1 is further increased in its first version until it lies outside the first prohibited area 4. The third vector Z3,2 is thereby obtained in a second version. This is then further used like a third vector Z3 as described further above.

It is then checked whether the third vector Z3,2, as just obtained, lies within the first required area 1. This is not the case. The third vector Z3,2 in its second version is then changed along the limitation of the first prohibited area 4 until it comes to lie on a limitation of the first required area 1. A fourth vector Z4 is thereby obtained.

The fourth vector Z4 is further then checked for whether it lies within the second required area Z2. This is not the case. Accordingly, the fourth vector Z4 is further changed along the limitation of the first prohibited area 4 until it comes to lie on a limitation of the second required area 2. The operational vector ZB is thereby obtained. This lies within all of the required areas 1, 2, 3 and outside the first prohibited area 4. The motor can thus be operated with it.

Since the parameters of the motor and the state of the system change the position and the size of the circles, it may be necessary in some situations to carry out the described processes one more time or more than one time, in particular including a respective recalculation of the circles. This allows optimal and updated operating parameters to be obtained.

The procedure described or a procedure can be represented for example as follows:
calculate the $i_q$ current for a given torque request,
find a point on the voltage circle,
find a point on the motor current circle,
find a point on the battery current circle,
repeat the previous three steps if necessary.

The sequence, according to which first the voltage circle is used, then continuing with the limitations of the circles, can be important to achieve the optimal vector as the operational vector.

It should be understood that limitations of a respective area can in each case be attributed to both the area and the area surrounding it.

The steps mentioned here for calculating or determining the operational vector can in particular be performed electronically, for example by a programmable or hard-wired unit. The operational vector can be calculated automatically.

The mentioned steps of the method according to an aspect of the invention may be performed in the sequence indicated. However, they may also be performed in a different sequence. In one of its embodiments, for example with a specific combination of steps, the method according to an aspect of the invention may be performed in such a way that no further steps are performed. However, in principle, further steps can also be performed, even steps that have not been mentioned.

The claims that are part of the application do not represent any renouncement of the attainment of further protection.

If it is found in the course of proceedings that a feature or a group of features is not absolutely necessary, then the applicant aspires right now to a wording for at least one independent claim that no longer has the feature or the group of features. This may be for example a subcombination of a claim available on the filing date or may be a subcombination of a claim available on the filing date that is restricted by further features. Claims or combinations of features of this kind requiring rewording are intended to be understood to be covered by the disclosure of this application as well.

It should further be pointed out that configurations, features and variants of aspects of the invention that are described in the various embodiments or exemplary embodiments and/or shown in the figures are combinable with one another in any way. Single or multiple features can be interchanged with one another in any way. Combinations of features arising therefrom are intended to be understood to be covered by the disclosure of this application as well.

Back-references in dependent claims are not intended to be understood as dispensing with the attainment of independent substantive protection for the features of the back-referenced subclaims. These features can also be combined with other features in any way.

Features that are disclosed only in the description or features that are disclosed in the description or in a claim only in conjunction with other features may fundamentally be of independent significance essential to an aspect of the invention. They can therefore also be individually included in claims for the purpose of distinction from the prior art.

The invention claimed is:

1. A method for operating a permanent magnet synchronous motor, the operating parameters of which are specified in a two-dimensional d/q coordinate system, the method comprising:
   receiving a torque request,
   converting the torque request into a first vector, a q coordinate of which corresponds to the torque request and a d coordinate of which is zero,
   representing a number of constraints as areas in the d/q coordinate system, each required area representing a constraint such that an operational vector should lie within the required area, and each prohibited area representing a constraint such that an operational vector should lie outside the prohibited area,
   checking whether the first vector lies within all of the required areas and outside all of the prohibited areas,
   if so, using the first vector as an operational vector,
   if not:
   determining respective highest q coordinates of the required areas, and reducing the q coordinate of the first vector to the lowest of the highest q coordinates of the required areas, thereby obtaining a second vector,
   checking whether the second vector lies within a first required area,
   if so, using the second vector as a third vector,
   if not, changing the d coordinate of the second vector, so that it lies on a limitation of the first required area with the smallest amount of the d coordinate, thereby obtaining a third vector,
   checking whether the third vector lies within a second required area,
   if so, using the third vector as a fourth vector,
   if not, changing the coordinates of the third vector along a change limitation up to the point of intersection between a limitation of the second required area with the change limitation with the highest q coordinate, thereby obtaining a fourth vector,
   determining an operational vector on the basis of the fourth vector,
   activating the permanent magnet synchronous motor by means of operational parameters that are indicated by the operational vector.

2. The method as claimed in claim 1, which comprises the following for determining an operational vector on the basis of the fourth vector:
   checking whether the fourth vector lies within a third required area,
   if so, using the fourth vector as an operational vector,
   if not, changing the coordinates of the fourth vector along a change limitation up to the point of intersection between a limitation of the third required area with the change limitation with the highest q coordinate, thereby obtaining the operational vector.

3. The method as claimed in claim 1,
   wherein the first required area defines a maximum voltage of the motor, and/or
   wherein the second required area defines a maximum current of the motor, and/or
   wherein the third required area defines a maximum battery current.

4. The method as claimed in claim 1,
   wherein the change limitation is a limitation of the first required area.

5. The method as claimed in claim 1,
   wherein the torque request defines a torque for driving or accelerating the motor.

6. The method as claimed in claim 1,
   wherein the torque request defines a torque for braking the motor.

7. The method as claimed in claim 6, wherein, before checking whether the third vector lies within the second required area, the following are performed:
   checking whether the third vector lies within a first prohibited area,
   if not, leaving the third vector unchanged for the next step,
   if so, increasing the amount of the d coordinate of the third vector up to a limitation of the first prohibited area before the next step.

8. The method as claimed in claim 7,
   wherein the first prohibited area defines a minimum battery current.

9. The method as claimed in claim 7,
   wherein, if the third vector is left unchanged in response to checking whether it lies within the first prohibited area, the change limitation is a limitation of the first required area,
   and/or
   wherein, if the amount of the d coordinate of the third vector is increased in response to checking whether it lies within the first prohibited area, the change limitation is a limitation of the first prohibited area.

10. The method as claimed in claim 6,
wherein the first required area defines a maximum voltage of the motor, and/or
wherein the second required area defines a maximum current of the motor, and/or
wherein the third required area defines a maximum battery current.

11. The method as claimed in claim 1,
wherein the d coordinates of all of the vectors are negative.

12. The method as claimed in claim 1,
wherein the vectors are moved along the change limitation by calculating points of intersection.

13. The method as claimed in claim 1,
wherein the required areas and/or the prohibited areas are circles.

14. The method as claimed in claim 1,
wherein at least one required area, which defines a maximum voltage of the motor, depends on a speed of the motor.

15. A motor assembly, comprising:
a permanent magnet synchronous motor, and
an electronic control device configured to perform a method as claimed in claim 1.

16. The method as claimed in claim 8,
wherein, if the third vector is left unchanged in response to checking whether it lies within the first prohibited area, the change limitation is a limitation of the first required area,
and/or
wherein, if the amount of the d coordinate of the third vector is increased in response to checking whether it lies within the first prohibited area, the change limitation is a limitation of the first prohibited area.

17. The method as claimed in claim 2,
wherein the first required area defines a maximum voltage of the motor (10), and/or
wherein the second required area defines a maximum current of the motor (10), and/or
wherein the third required area defines a maximum battery current.

* * * * *